Patented July 10, 1934

1,965,693

UNITED STATES PATENT OFFICE 1,965,693

SIZED PAPER

Henry V. Dunham, Bainbridge, N. Y., assignor, by mesne assignments, to The Casein Manufacturing Company of America, Inc., New York, N. Y., a corporation of Delaware No Drawing. Original application September 23, 1925, Serial No. 58,202. Divided and this application March 27, 1929, Serial No. 350,446

11 Claims. (Cl. 91—68)

The present invention relates to a sized product, and the application is a division of my co-pending application 58,202, filed September 23, 1925.

This application describes the manufacture of a sizing or coating from seeds of the legume family containing protein or other adhesive substances. It is well known that different seeds such as the peanut, castor oil bean, soy bean and the like, contain certain protein or related adhesive substances which substances when separated and treated with alkaline compounds such as those of the alkalies or alkaline earths, etc., produce certain fairly adhesive materials suitable for sizings and glues. Associated with these protein substances in the seed or seed meal, there are certain other materials among which substances there is also present more or less cellular substance notably cellulose, fiber, hulls, and also other substances present which cannot be dissolved by means of alkalies or alkaline earths. These cellular substances and the like, therefore, interfere when any attempt is made to produce a good smooth, apparently well dissolved glue or sizing which would be suitable for the sizing of paper, the gluing of clay onto paper for making a coating for lithographic printing and the like.

When a finely ground meal from one of the seeds indicated above, is treated with water containing a dissolving agent for the protein substance, the cellular substance and other insoluble matter if left as such in the product would produce a rough surface when the resulting glue or sizing is applied to paper.

My present invention has for its object the eliminating of the cause of this roughness of the cellular and other substance not soluble in alkali, by means of such a fine subdivision of the insoluble portion of the material as to eliminate this tendency of the insoluble portion of the meal to appear rough when applied to paper or mixed with clay or other coating agent for sizing or coating on paper and the like. Furthermore, I find that the more finely sub-divided are the particles of legume seeds containing protein, the more readily is the protein portion dissolved out of the insoluble portion by means of the alkaline solvent.

To accomplish these results I preferably use a meal ground to say about 80 mesh as a starting material. This meal is mixed in the proportion of, say, 100 parts by weight of meal to 400 parts by weight of cold water containing, say about 6 parts of caustic soda. These proportions can vary over a wide range. The mixture is preferably now heated to about 160° F., and is then put through any satisfactory colloid mill. Colloid mills are sufficiently well known in the chemical industry to need no particular description. There are several types on the market and any of the well known types may be used for this purpose. After the wet mixture containing the bean meal has been put through the colloid mill it is ready to be used as a size. It is perfectly smooth, the cellular particles have been so finely subdivided that no resulting roughness or substantially no roughness appears when the solution is applied to paper or when it is mixed with clay as a coating for paper, and the paper then dried, as desired.

In referring in this specification to a "legume seed meal", it is to be understood that I mean a meal which is made by simply grinding the seed to a very fine mesh or a meal from which a portion or substantially all of the oil has first been extracted or removed or preferably a meal from which the outer shell has first been removed and thereafter ground with or without the oil having been extracted. The extraction of the oil may include pressing, leaching with solvents, or both, or other well known methods. It is not intended to cover thereby, the protein content alone (i. e. separated from the other solid constituents of the meal).

In referring to the alkali salts or the salts of the alkaline earths in this specification, I refer to the salts or other compounds of those metals which are soluble in water and which give an alkaline reaction to litmus paper whether one or more of such salts are employed.

In order to more fully describe this process I give below examples which are by way of illustration only. It is understood that I can vary the method of procedure between quite wide limits without departing from the scope of this invention.

*Example 1.*—100 lbs. of ground soy bean meal, such meal containing the usual amount of oil and husk or outer shell. This meal is ground as finely as possible and without separating the oil, is then mixed with 400 lbs. of water and 6 lbs. of caustic soda. By means of a steam jacketed kettle or other suitable heating device, this mixture is heated to about 160° F. It is then run directly through a colloid mill to thoroughly disintegrate all solid particles to a smooth thin pulp. The material is then ready to use as a sizing or adhesive.

Example 2.—100 lbs. of meal as described in Example 1, 400 lbs. of water, 10 lbs. of tri-sodium phosphate and 3 lbs of sodium sulphite. Heat to 160° F., put through the colloid mill as in Example 1.

Example 3.—100 lbs. of soy bean meal from which the oil has been expressed in the usual commercial way (say by high pressure), ground to 80 mesh, 3 lbs. of caustic soda, 5 lbs. of tri-sodium phosphate, 400 lbs. of water. Heat to 160° F., and put through the colloid mill.

Example 4.—100 pounds of peanut meal from which the oil has been removed in the usual commercial way (e. g. by pressure followed by extraction with solvents such as gasoline). The meal is preferably ground to 80 mesh. 10 lbs. tri-sodium phosphate, 5 lbs. of a slightly alkaline reacting sodium fluoride, 400 pounds of water. Heat to 160° F., and put through colloid mill as in Example 1.

Example 5.—100 lbs. of peanut meal as in Example 4, 5 pounds of calcium hydroxide, 5 lbs. of tri-sodium phosphate, 5 lbs. of an alkaline reacting sodium fluoride, 400 lbs. of water. Put through the colloid mill as in Example 1.

Example 6.—100 lbs. of castor oil bean meal from which the oil has been removed in the usual commercial way, ground to 80 mesh, 10 lbs. of borax, 10 lbs. tri-sodium phosphate and 400 lbs. water. Heat to 160° F., and put through colloid mill. This gives a very dark colored sizing and it would only be desirable where delicate shades are not important.

It is evident that other alkalies and other proportions than those enumerated above can be used and that the amount of water may be greater or less as desired. It is also to be understood that the temperature mentioned in each of these examples as 160, can be varied between wide limits, in fact, it is possible to get the desired results without heating the mixture at all but the reaction in my opinion is more rapid if a temperature of about the degree mentioned in the examples is used.

It is understood that this improved vegetable glue or sizing could be made by simply grinding the press cake as described above to a relatively fine mesh, mixing with the meal one or more of the dry water soluble alkali or alkaline earth metal compounds or salts. Such mixture could then be shipped to a paper plant or other factory where it is intended to use the product. The users could then mix the material in water and heat it to 160° F., or thereabouts and then put it through a colloid mill at the point where the material is to be used or the ground meal alone may be shipped to the point where it is to be used and the user may mix the meal with water and the necessary chemicals mentioned in this specification, heating the material and putting it through the colloid mill and it is ready for use.

I prefer usually to remove the oil as completely as possible from the seeds before use. In some cases it might be possible (when using seeds or meal containing much oil) to separate some oil after treatment with the alkali, as by use of a centrifugal cream separator. Also in some cases it might be possible to remove any small amounts of relatively coarse solid insoluble material in this manner. Such steps however are not usually necessary or wholly satisfactory.

It will be understood that other adhesive materials, glue, casein, starch glues, etc., can be used in conjunction with the above.

The glue solution can be dried, for shipment, if desired, on suitable driers, such as those used in drying ordinary glue solutions, milk, etc.

The treatment in the colloid mill, i. e. grinding operation, can be continued until all the insoluble solid matter has been reduced to practically a colloidal suspension, or it may be stopped short of this point, and the fluid mixture can be passed through a very fine sieve, such as a bolting cloth, to remove any unreduced particles. I prefer to continue the grinding action long enough to reduce practically everything to an impalpably fine state.

I claim:

1. A cellulose fiber product treated with a size embodying flour of leguminous seed meal, the insoluble portions of said size being in a sufficiently fine state to produce substantially no roughness in the surface of the dried sized material.

2. A cellulose fiber product treated with a size embodying flour of a seed meal of high protein content together with casein, the insoluble portions of said size being in a sufficiently fine state to produce substantially no roughness in the surface of the dried sized material.

3. Paper coated with a size comprising casein and a seed meal of high protein content, in which the portions insoluble in dilute alkali have been reduced to a very fine state.

4. Paper coated with a size embodying flour of leguminous seed meal, the insoluble portions of said size being in a sufficiently fine state to produce substantially no roughness in the surface of the dried sized material.

5. Paper coated with a size embodying flour of a seed meal of high protein content together with casein, the insoluble portions of said size being in a sufficiently fine state to produce substantially no roughness in the surface of the dried sized material.

6. A cellulose fiber product treated with a size embodying flour of a seed meal of high protein content, other than soy bean, together with casein.

7. Paper coated with a size comprising casein and a seed meal of high protein content, other than soy bean, in which the portions insoluble in dilute alkali have been reduced to a very fine state.

8. A cellulose fiber product treated with a size embodying flour of a seed meal of high protein content, selected from the herein described class consisting of peanut meal and castor oil bean meal, together with casein.

9. Paper coated with a size comprising casein and a seed meal of high protein content, selected from the herein described class consisting of peanut meal and castor oil bean meal, in which the portions insoluble in dilute alkali have been reduced to a very fine state.

10. The process of making an adhesive or sizing material which comprises mixing protein-rich seed meal with an alkali solution, the amount of alkali being at least substantially sufficient to react with the proteids present, and the amount of water present being much more than the combined amounts of the other materials, and thereafter grinding the insoluble materials present, to a substantially impalpable condition, whereby when using the composition as a sizing or coating composition, and drying the product, a smooth coated product is produced.

11. The process of making an adhesive or sizing material which comprises mixing protein-rich seed meal and casein with an alkali solution, the amount of alkali being at least substantially sufficient to react with the proteids present, and the amount of water present being much more than the combined amounts of the other materials, and thereafter grinding the insoluble materials present, to a substantially impalpable condition, whereby when using the composition as a sizing or coating material, and drying the product, a smooth coated product is produced.

HENRY V. DUNHAM.